United States Patent [19]
Sarma et al.

[11] Patent Number: 6,117,387
[45] Date of Patent: Sep. 12, 2000

[54] APPARATUS FOR PRODUCTION OF DIRECT REDUCED IRON WITH REDUCED FUEL CONSUMPTION AND EMISSION OF CARBON MONOXIDE

[75] Inventors: Balu Sarma, Airmont; Maynard Guotsuen Ding, Yorktown Heights, both of N.Y.

[73] Assignee: Praxair Technology, Inc., Danbury, Conn.

[21] Appl. No.: 09/327,568

[22] Filed: Jun. 8, 1999

Related U.S. Application Data

[62] Division of application No. 08/876,752, Jun. 16, 1997, Pat. No. 5,951,740.

[51] Int. Cl.$^7$ .................................................. C21B 7/22
[52] U.S. Cl. ...................................... 266/145; 266/177
[58] Field of Search ............................ 266/145, 177; 75/484

[56] References Cited

U.S. PATENT DOCUMENTS 5,567,224  10/1996  Kundrat ................................ 75/484
5,730,775  3/1998  Meissner ................................ 75/484

OTHER PUBLICATIONS

Feinman, "Iron by Direct Reduction", Encyclopedia of Chemical Technology, vol. 13 pp. 754–763 (1981).

Hanewald et al., "Recovery of Metals from Steel Wastes and Production of DRI by the INMETCO Process", Iron and Steel Engineer, pp. 62–67 (Mar., 1985).

Tennies et al., "The Midrex Fastmet Process, a Simple Economic Ironmaking Option", Metallurgical Plant and Technology International, pp. 36–42 (Feb., 1991).

*Primary Examiner*—Melvyn Andrews
*Attorney, Agent, or Firm*—Donald T. Black

[57] ABSTRACT

A system for producing direct reduced iron wherein iron oxide material and carbonaceous material is passed successively through an oxidizing zone and a reducing zone of a furnace, each zone fired by oxy-fuel combustion, enabling a reduction in the amount of fuel needed to process the material while generating sufficient carbon monoxide to effect the reduction and ensuring that little or no carbon monoxide is emitted from the furnace.

4 Claims, 1 Drawing Sheet

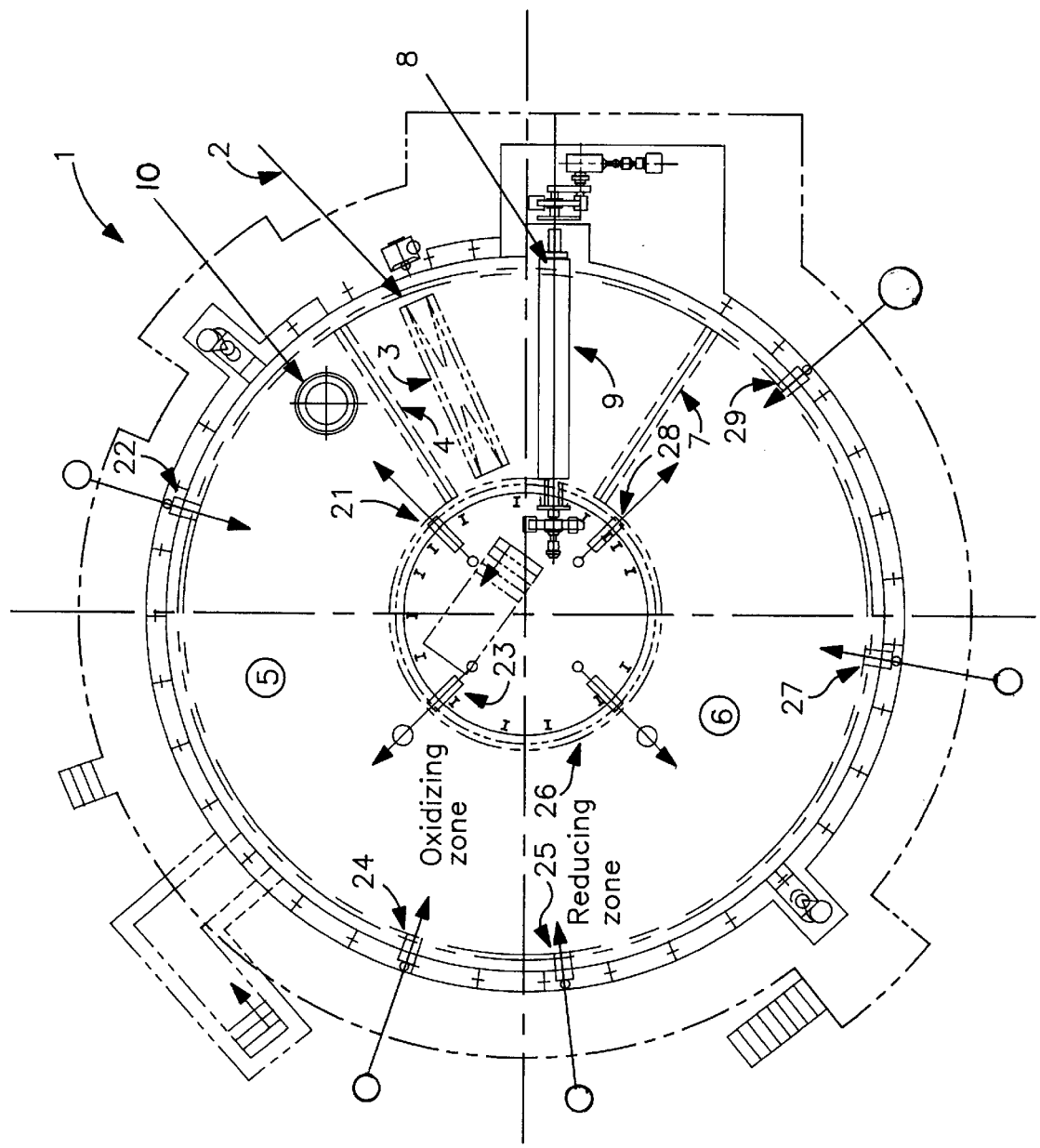

APPARATUS FOR PRODUCTION OF DIRECT REDUCED IRON WITH REDUCED FUEL CONSUMPTION AND EMISSION OF CARBON MONOXIDE

This is a Division of prior U.S. application(s) Ser. No. 08/876,752 Filing Date: Jun. 16, 1997 now U.S. Pat. No. 5,951,740.

TECHNICAL FIELD

This invention relates generally to the direct reduction of iron oxide material.

BACKGROUND ART

The direct reduction of iron ore, i.e. iron oxides, is accomplished by reduction of the iron ore by reaction with carbon monoxide, hydrogen and/or solid carbon through successive oxidation states to metallic iron. Typically, oxides of iron and carbonaceous material, e.g. coal, are charged into a furnace. Heat supplied into the furnace by the combustion of fuel with air generates, inter alia, carbon monoxide. As the iron ore and reducing agents pass through the furnace, the iron ore is reduced to metallic iron, and recovered from the furnace. Furnace gases are passed out from the furnace through a flue or exhaust conduit. It is desirable to reduce the amount of fuel which is used to produce the iron as this decreases the costs of producing the iron.

Recently there has arisen, due to environmental concerns, a need to reduce the amount of carbon monoxide emitted from the furnace in the production of direct reduced iron. Accordingly, it is another object of this invention to provide a method for producing direct reduced iron which generates reduced emissions of carbon monoxide when compared with conventional direct reduction processes.

SUMMARY OF THE INVENTION

The above and other objects, which will become apparent to one skilled in the art upon a reading of this disclosure, are attained by the present invention, one aspect of which is:

A method for producing direct reduced iron comprising:
(A) providing feed comprising iron oxide material and carbonaceous material into an oxidizing zone of a furnace, providing first oxidant and first fuel into the oxidizing zone through a plurality of oxidizing burners, said first oxidant being a fluid having an oxygen concentration of at least 25 mole percent, and combusting first oxidant and first fuel in the oxidizing zone to heat the feed;
(B) passing heated feed from the oxidizing zone into a reducing zone of the furnace;
(C) providing second oxidant and second fuel into the reducing zone through a plurality of reducing, burners, said second oxidant being a fluid having an oxygen concentration of at least 25 mole percent, and combusting second oxidant and second fuel in the reducing zone to produce combustion reaction products including carbon monoxide;
(D) reacting iron oxide material with carbonaceous material and carbon monoxide in the reducing zone to reduce the iron oxide material and produce direct reduced iron; and
(E) recovering direct reduced iron from the furnace.

Another aspect of the invention is:

Apparatus for producing direct reduced iron comprising:
(A) a furnace having an oxidizing zone and a reducing zone;
(B) means for providing feed comprising iron oxide material and carbonaceous material into the oxidizing zone;
(C) a plurality of oxidizing burners for providing oxidant and fuel into the oxidizing zone, each of said oxidizing burners communicating by conduit means to a source of fuel and a source of oxidant having an oxygen concentration of at least 25 mole percent;
(D) a plurality of reducing burners for providing oxidant and fuel into the reducing zone, each of said reducing burners communicating by conduit means to a source of fuel and a source of oxidant having an oxygen concentration of at least 25 mole percent; and
(E) means for recovering direct reduced iron from the furnace.

As used herein, the term "stoichiometric" means the amount of oxygen needed to completely combust a given amount of fuel.

As used herein, the term "superstoichiometric" means a ratio of oxygen to fuel which exceeds stoichiometric.

As used herein, the term "substoichiometric" means a ratio of oxygen to fuel which is less than stoichiometric.

As used herein, the term "oxidizing burner" means a burner which provides oxygen and fuel in a superstoichiometric ratio.

As used herein, the term "reducing burner" means a burner which provides oxygen and fuel in a stoichiometric or substoichiometric ratio.

BRIEF DESCRIPTION OF THE DRAWING

The sole FIGURE is a cross-sectional top view of one preferred embodiment of the invention.

DETAILED DESCRIPTION

The invention will be described in detail with reference to the FIGURE and for a particularly preferred embodiment.

Referring now to the FIGURE, there is shown rotary hearth furnace 1 in top cross-sectional view. Any suitable direct reduction furnace may be used in conjunction with the practice of the invention. The rotary hearth type, i.e. doughnut shaped, furnace illustrated in the FIGURE is a preferred such furnace. Feed 2 is passed into the furnace through feed box 3 and travels through curtain 4 into oxidizing zone 5 of furnace 1.

Feed 2 comprises iron oxide material and carbonaceous material. The iron oxide material may include one or more of iron ore, steel plant waste oxides such as blast furnace dusts and sludges, basic oxygen furnace dusts and sludges, mill scale, rolling mill sludge, electric arc furnace dust, and stainless steelmaking dusts and sludges. The carbonaceous material may include one or more of coal, coke, petroleum coke and char.

First oxidant and first fuel are provided into oxidizing zone 5 through a plurality of oxidizing burners designated in the FIGURE as 21, 22, 23 and 24. The first oxidant is a fluid having an oxygen concentration of at least 25 mole percent, preferably at least 40 mole percent, most preferably 90 mole percent or greater. The first fuel may be any suitable fuel such as methane, natural gas, oil or coal. Preferably, the first oxidant and the first fuel are provided into the oxidizing zone in a superstoichiometric ratio such that the oxygen concentration in the furnace gas, i.e. atmosphere, in the oxidizing zone is within the range of from 2 to 10 volume percent.

The first oxidant and first fuel combust in oxidizing zone 5 to produce heat and combustion reaction products such as carbon dioxide and water vapor. The heat from the combustion serves to heat the feed. Superstoichiometric ratios generally result in lower flame temperatures because of the dampening effect of the added gas. However, with the practice of this invention, the elevated concentration of oxygen in the oxidant compensates for this dampening effect by reducing the amount of nitrogen which would have been passed into the furnace on an equivalent oxygen molecule basis if air were used as the oxidant, and enables much lower fuel consumption in the oxidizing zone while maintaining the temperature high so as to effectively heat the feed. Typically, in the practice of this invention, the temperature within the oxidizing zone will be within the range of from 1100 to 1250° C.

The feed material passes through the oxidizing zone while being heated. In the rotary hearth furnace illustrated in the FIGURE, the feed material passes through oxidizing zone 5 in a counterclockwise direction. The heated feed is then passed from oxidizing zone 5 into reducing zone 6 of furnace 1. As will be appreciated by those skilled in the art, there is no clear demarcation where the oxidizing zone terminates and the reducing zone begins; rather there is a transitional distance. The existence of the oxidizing zone and reducing zone is governed by the burners which service each zone.

Second oxidant and second fuel are provided into reducing zone 6 through a plurality of reducing burners designated in the FIGURE as 25, 26, 27, 28 and 29. Typically from 3 to 10 burners would be used in the reducing zone in the practice of this invention while from 2 to 8 burners would be used in the oxidizing zone in the practice of this invention. A preferred burner for use as both the oxidizing burner and the reducing burner for the practice of his invention is the combustion apparatus disclosed and claimed in U.S. Pat. No. 5,100,313—Anderson et al. Those skilled in the art will also recognize that each of the oxidizing burners and reducing burners are in flow communication with, i.e. are connected by conduit means to, sources of oxidant and fuel, which sources are not functionally illustrated in the FIGURE but are shown in representational form as the circles at the end of the flow arrows.

The second oxidant is a fluid having an oxygen concentration of at least 25 mole percent, preferably at least 40 mole percent, most preferably 90 mole percent or greater. The second fuel may be any suitable fuel such as methane, natural gas, oil or coal. The second oxidant and the second fuel are provided into the reducing zone in a ratio such that there is no oxygen present in the furnace gas in the reducing zone atmosphere once the combustion occurs.

The second oxidant and the second fuel combust in reducing zone 6 to produce heat and combustion reaction products. Because of the lesser availability of oxygen molecules with respect to fuel in the reducing zone as opposed to the oxidizing zone, the fuel is not completely combusted and consequently the combustion reaction products produced in the reducing zone include carbon monoxide. The heated carbonaceous material and the carbon monoxide react with the iron oxide material and reduce the iron oxide material to direct reduced iron as the iron oxide material and the carbonaceous material pass through the reducing zone, which, in the rotary hearth furnace illustrated in the FIGURE, is counterclockwise flow. The reduction of the iron oxide material in the reducing zone is endothermic and thus a large amount of heat is provided into the reducing zone to sustain the reduction. Typically the temperature within the reducing zone is within the range of from 1200 to 1350° C. With the use of the elevated oxygen concentration of the second oxidant of the invention, one can operate with a greater degree of reducing conditions in the reducing zone without losing heat transfer efficiency due to low flame temperatures caused by the large amount of nitrogen which would be provided into the furnace were air used as the oxidant. Again, as with the oxidizing zone practice, this translates into significant fuels savings for any given level of production.

The direct reduced iron is passed through curtain 7 and then out of the furnace through discharge passage 8 by operation of discharge screw 9, and recovered as product direct reduced iron.

Preferably the oxidant is provided from each burner into the oxidizing or reducing zone, as the case may be, at a high velocity, such as at least 200 feet per second (fps) and, most preferably, at least 500 fps. The high velocity of the oxidant will enable some furnace gases to aspirate into the oxidant prior to the combustion of the oxidant with the fuel, thus improving the overall heat distribution from the combustion reactions of the several burners. In order to avoid flame instability caused by high velocity oxidant, a lower velocity secondary oxidant stream may be passed from the burner into the furnace between the fuel and the high velocity main oxidant stream. Such a secondary oxidant stream would have a velocity less than that of the main oxidant stream, preferably less than 200 fps, most preferably less than 100 fps, and would comprise less than 10 percent of the oxidant provided into the furnace from that burner.

The high flame temperatures in the furnace resulting from the use of oxidant having an elevated oxygen concentration serves to ensure that most or all of the carbon monoxide which is not oxidized in carrying out the reduction of the iron oxide material, is preferentially converted to carbon dioxide within the furnace, thus reducing the emission of carbon monoxide to the ambient atmosphere.

The FIGURE illustrates a preferred embodiment of the invention wherein an exhaust conduit or flue 10 communicates with the furnace interior in oxidizing zone 5. The gas flow within the furnace is countercurrent to the flow of iron oxide material and carbonaceous material within the furnace. That is, with respect to the arrangement illustrated in the FIGURE, the flow of gas within the furnace is above the flow of iron oxide material and carbonaceous material, and in a clockwise direction. This enhances the carbon monoxide reduction drive of the invention because any excess carbon monoxide will first pass through the major portion of the oxidizing zone prior to reaching the flue. In the oxidizing zone the remaining carbon monoxide will encounter excess oxygen molecules at a higher partial pressure of oxygen as well as high flame temperatures, which will serve to further convert the carbon monoxide to carbon dioxide within the furnace. The furnace gases, e.g. combustion reaction products, are passed out of furnace 1 by passage through flue 10.

The arrangement illustrated in the FIGURE is particularly preferred in that one of the oxidizing burners, in this case burner 21, is oriented to direct oxidant and fuel toward flue 10. The arrows passing through the burners in the FIGURE are meant to denote the flow direction of the oxidant and fuel from the burner into the furnace. This arrangement further ensures that carbon monoxide is converted to carbon dioxide within the furnace and is not emitted out from the furnace.

The following example and comparative example are presented to further illustrate the invention and to demonstrate advantages attainable thereby. They are not intended to be limiting.

A rotary hearth furnace was employed to process chrome and nickel oxide bearing steelmaking sludges along with nickel-cadmium batteries to produce direct reduced iron at a rate of 8 tons per hour (tph). The carbonaceous material passed into the furnace along with the iron oxide material was powdered coke. The system employed 6 burners in the oxidizing zone operating at 145 percent of stoichiometric and 10 burners in the reducing zone operating at 100 percent of stoichiometric. The fuel was natural gas and the oxidant was air for each of the 16 burners. The results of this conventional process are tabulated in Table 1.

TABLE 1

|  | Oxidizing Zone | Reducing Zone | Total |
|---|---|---|---|
| Heat Generated (MM Btu/h) | 4.3 | 12.17 | 16.47 |
| Available Heat (MM Btu/h) | 1.03 | 4.46 | 5.49 |
| Thermal Efficiency (%) | 23.9 | 36.7 | 33.3 |
| Natural Gas Consumption (scfh) | 4,214 | 12,016 | 16,257 |
| Off-gas Volume from burners (scfh) | 62,816 | 126,397 | 189,213 |

Similar feed material is processed using the invention to produce direct reduced iron. The system employed is similar to that illustrated in the FIGURE wherein 4 burners are used in the oxidizing zone and 5 burners are used in the reducing zone with one of the oxidizing zone burners oriented to direct the combustion reaction toward the exhaust. Natural gas is used as the fuel for each burner and a fluid having an oxygen concentration of 92 mole percent is used as the oxidant for each burner. The oxidizing zone burners are operated at 111 percent of stoichiometric and the reducing zone burners are operated at 100 percent of stoichiometric. The invention enables the production of direct reduced iron at a production rate of 16 tph. The results of this example of the invention are tabulated in Table 2.

TABLE 2

|  | Oxidizing Zone | Reducing Zone | Total |
|---|---|---|---|
| Heat Generated (MM Btu/h) | 2.88 | 12.74 | 15.6 |
| Available Heat (MM Btu/h) | 2.06 | 8.92 | 10.98 |
| Thermal Efficiency (%) | 71.2 | 70.2 | 70.4 |
| Natural Gas Consumption (scfh) | 2,847 | 12,558 | 15,405 |
| Off-gas Volume from burners (scfh) | 9,837 | 40,465 | 50,302 |

As can be seen from the results shown in the tables, the practice of the invention enables a doubling of the production rate of direct reduced iron while the fuel consumption actually decreases. The fuel savings in the reported example is 52.6 percent on a per ton of product basis over that of the conventional system. Moreover, the lower specific fuel consumption results in lower emission of carbon monoxide as well as carbon dioxide and NOx on a pound per hour basis.

Still further, the practice of the invention enables a significant reduction in the number of burners required to operate the furnace, thus significantly lowering the capital cost of producing direct reduced iron.

In the event higher productivity is not required, the invention may be used to improve the quality of the direct reduced iron. This is accomplished by increasing the amount of carbonaceous material provided into the furnace and increasing the residence time of the material passing through the furnace. The high temperatures and improved thermal efficiency attained with the invention enable an increase in the amount of carbon diffused into the product iron as well as the degree of metallization of the feed material due to the increased residence time afforded by the high temperatures attained with the practice of the invention.

Now with the practice of this invention one can produce direct reduced iron while generating reduced levels of carbon monoxide emissions, using less fuel, employing fewer burners and generating less exhaust gas compared to heretofore available direct reduction methods for any given level of production. Although the invention has been described in detail with reference to a certain preferred embodiment, those skilled in the art will recognize that there are other embodiments of the invention within the spirit and scope of the claims.

What is claimed is:

1. Apparatus for producing direct reduced iron comprising:

(A) a furnace having an oxidizing zone and a reducing zone;

(B) means for providing feed comprising iron oxide material and carbonaceous material into the oxidizing zone;

(C) a plurality of oxidizing burners for providing oxidant and fuel into the oxidizing zone, which provide said oxidant and said fuel into the oxidizing zone in a superstoichiometric ratio such that the oxygen concentration in the furnace gas in the oxidizing zone is from 2 to 10 volume percent, each of said oxidizing burners communicating by conduit means to a source of fuel and a source of oxidant having an oxygen concentration of at least 25 mole percent;

(D) a plurality of reducing burners for providing oxidant and fuel into the reducing zone, which provide said oxidant and said fuel into the reducing zone in a ratio such that there is no oxygen present in the furnace gas in the reducing zone when combustion occurs in the reducing zone, each of said reducing burners communicating by conduit means to a source of fuel and a source of oxidant having an oxygen concentration of at least 25 mole percent; and (E) means for recovering direct reduced iron from the furnace.

2. The apparatus of claim 1 wherein the furnace is a rotary hearth furnace.

3. The apparatus of claim 1 further comprising an exhaust conduit located in the oxidizing zone.

4. The apparatus of claim 3 wherein an oxidizing burner is positioned to provide oxidant and fuel into the furnace in a direction toward the exhaust conduit.

* * * * *